Mar. 13, 1923.
R. J. ALTGELT
SCREW DEVICE
Filed Nov. 5, 1920
1,448,426
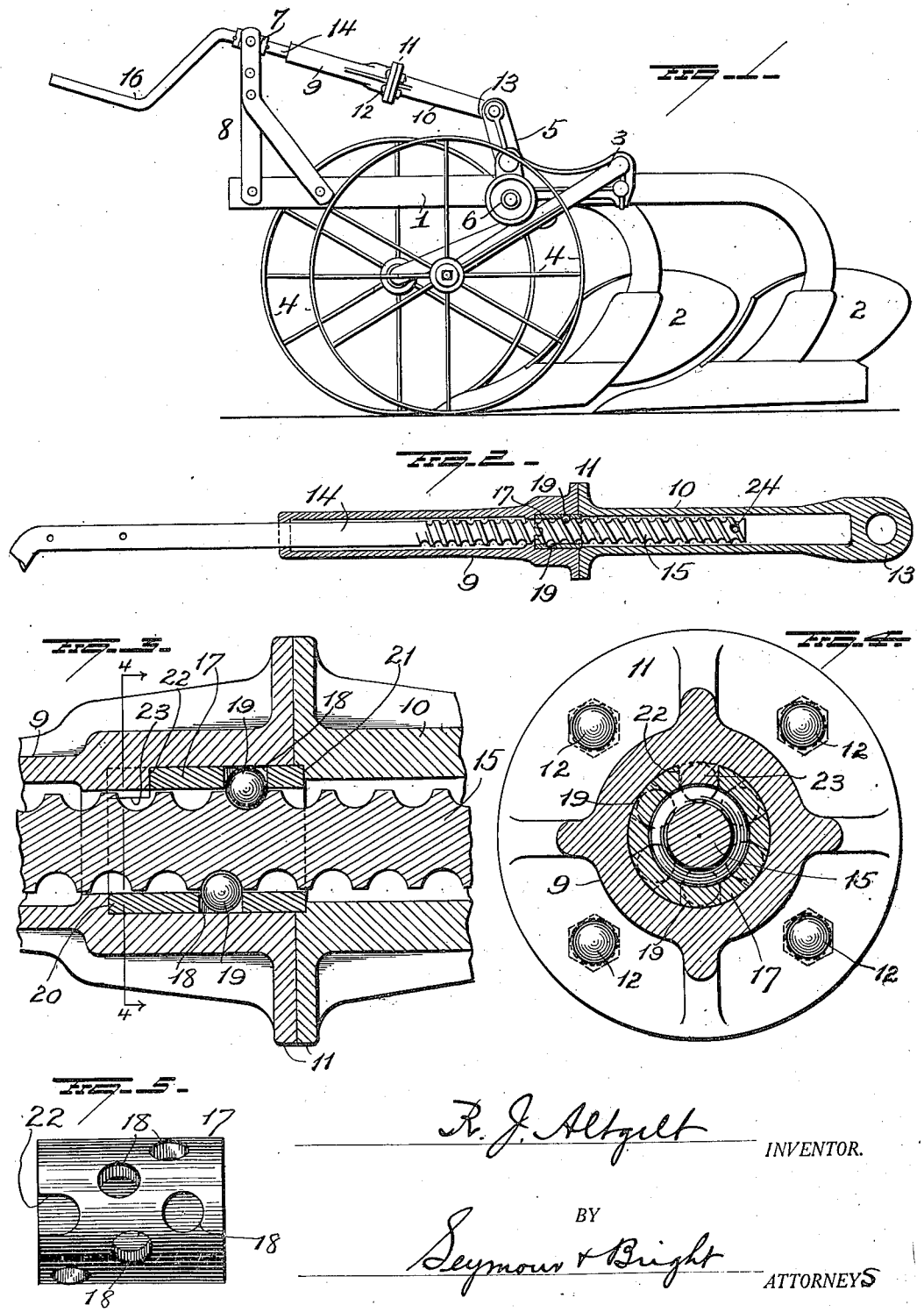

Patented Mar. 13, 1923.

1,448,426

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

SCREW DEVICE.

Application filed November 5, 1920. Serial No. 421,987.

*To all whom it may concern:*

Be it known that I, RUDOLPH J. ALTGELT, a citizen of the United States, and a resident of South Bend, in the county of St. Joseph and State of Indiana, have invented certain new and useful Improvements in Screw Devices; and I do hereby declare the following to be a full, clear, and exact description of the invention, such as will enable others skilled in the art to which it appertains to make and use the same.

This invention relates to improvements in screw-devices and particularly to such as are adaptable for use in transmitting power to a device to be moved or adjusted.

One object of my invention is to provide a simple and efficient screw construction which may be operated with a minimum amount of power to move a part a maximum distance by a minimum number of rotations of the screw member.

A further object is to provide a screw construction in which the screw member may be made with long-pitch threads, with simple and efficient ball bearing means cooperable with the thread of the screw whereby maximum leverage may be applied to the part to be moved by the screw with a minimum amount of power applied for rotating the screw.

With these and other objects in view, the invention consists in certain novel features of construction and combinations of parts as hereinafter set forth and pointed out in the claim.

In the accompanying drawings; Figure 1 is a view showing an application of my invention; Figure 2 is a longitudinal sectional view illustrating my improved screw construction; Figure 3 is an enlarged fragmentary longitudinal section; Figure 4 is a transverse section on the line 4—4 of Figure 3, and Figure 5 is a separate view of the ball carrier.

In the drawing, I have illustrated the application of my improvements to a wheeled plow structure for adjusting the same for depth of plowing. As here shown, the plow structure may comprise the plow frame 1 carrying plow bases 2 and on this frame, crank axle members 3 may be mounted and provided with suitable spindle portions which enter the hubs of the carrying wheels 4. A lever 5, which may be mounted on the plow frame, carries a roller 6 to bear on the crank arm of one of the axle members, and with this lever, one member of my improved screw device may be connected. The screw shaft constituting another member of said screw device may be mounted to turn freely (and without longitudinal movement) in a sleeve 7 which is pivotally mounted in the upper portion of a suitable bracket 8 secured to the plow frame. It is evident that by turning the screw shaft or member, the other member of the device will be moved longitudinally and motion will be transmitted through the lever 5 to the crank axle and cause the plow frame to be raised or lowered, thus effecting adjustment of the plow bases for depth of plowing.

It is a matter of importance, especially when the depth adjustment of a wheeled plow is effected through the medium of a screw device which is manually operated, that a maximum leverage with a minimum number of turns of the screw shall be applied by the latter to plow frame, and at the same time reduce to a minimum the amount of manually applied power necessary to accomplish such result. To accomplish the result of effecting quick and adequate movement of a part to be lifted or moved, with a minimum expenditure of power, the screw device now to be described in detail may be employed.

9, 10 represent two aligning tubular members, having annular flanges 11 through which bolts 12 are passed for securing the two members together. One end of the tubular member 10 is closed and provided with a perforated head 13 to facilitate connection of the device to a part to be moved or adjusted,—the lever 5 shown in Figure 1, for example. A screw shaft 14 passes through the tubular member 9 and enters the member 10. The threads 15 of the screw shaft are made of long pitch and this threaded portion is completely housed and protected against dust by the tubular members of the device. The screw shaft extends beyond the free end of the tubular member 9 and may be provided with a crank handle 16 to facilitate its manual operation,—a suitable bearing being provided for said screw shaft,—such for example, as the pivoted sleeve 7 shown in Figure 1.

A cylindrical member 17 having perforations 18 and constituting a carrier or cage for anti-friction balls 19, is inserted into the bore of the tubular member 9 at the inner end of the latter, with the balls 19 engaging the thread of the screw as clearly shown in Figures 3 and 4,—said balls also bearing against the walls of the bore in the member 9. Within the bore of the member 9, a shoulder 20 is formed and provides an abutment for one end of the ball cage 17, while the other end of said cage projects beyond the inner end of said member and is seated in a recess 21 in the inner end of the member 10. One end of the cage is provided with a notch 22 which engages a lug 23 projecting into the bore of the member 9 near the shoulder 20, and thus the cage is prevented from rotary movement.

In order to prevent possibility of the free inner end of the screw from passing the ball bearing devices and to prevent the complete withdrawal of the screw from the tubular members, a pin or projection 24 is provided near the free end of said screw.

My improvements are simple in construction and will operate, in practice, effectually to accomplish the results hereinbefore stated.

Having fully described my invention what I claim as new and desire to secure by Letters-Patent, is:—

In a device of the character described, the combination of a tubular body portion comprising two aligning members having abutting flanges, bolts passing through said flanges and rigidly securing said two members togetherd and said tubular body constructed at one end for attachment to a part to be moved, a ball cage disposed in one of said members and movable longitudinally with the same, means for preventing rotation of said cage, one of said members having a seat against which one end of the cage rests, a manually operable screw entering the tubular body portion and passing through said cage, and anti-friction balls located in said cage and engaging the threads of said screw.

In testimony whereof, I have signed this specification in the presence of two subscribing witnesses.

RUDOLPH J. ALTGELT.

Witnesses:
 ROSE B. MARBAUGH,
 JENNIE DAVIS.